June 14, 1960  S. CARLSSON ET AL  2,940,614
LOADING AND UNLOADING APPARATUS FOR FIBERBOARD
OR SHEETS OF SIMILAR MATERIAL
Filed Sept. 12, 1958  2 Sheets-Sheet 2
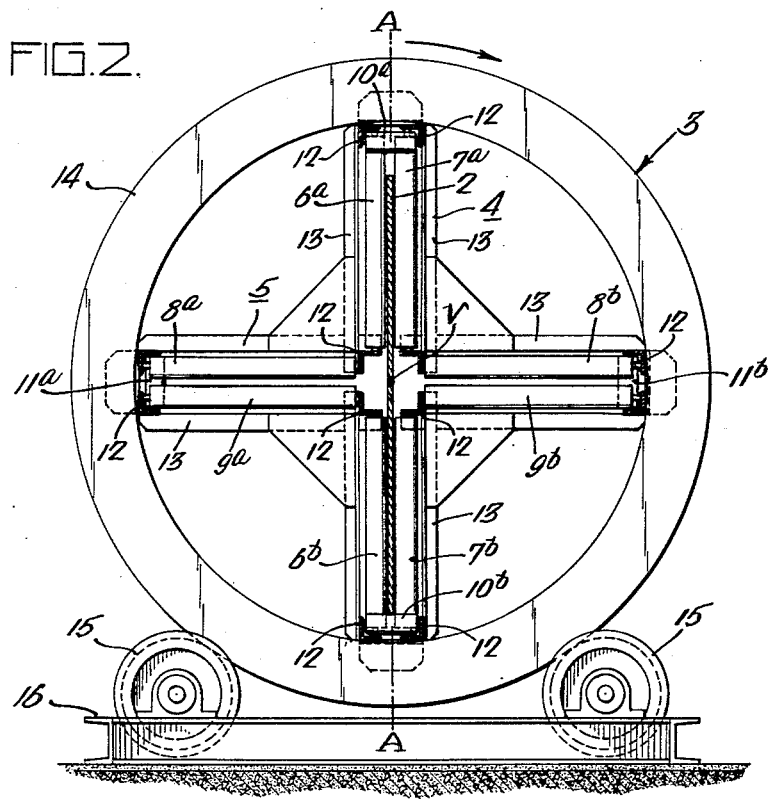
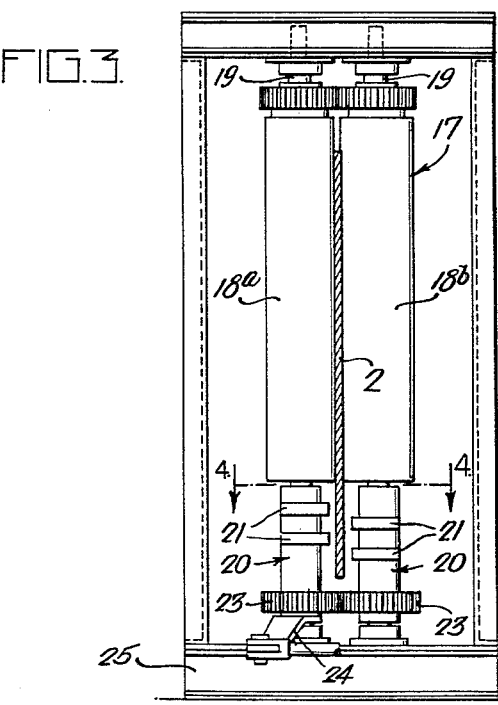
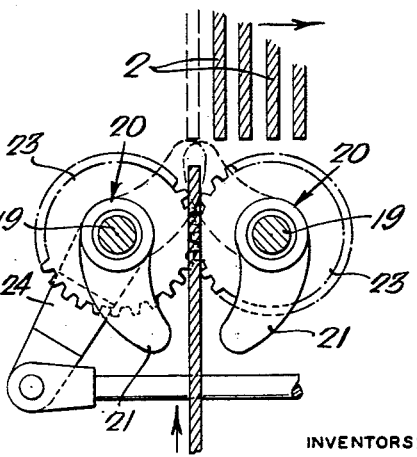
INVENTORS:
SVEN CARLSSON
GUSTAF HELLNER
BY Howson & Howson
ATTYS.

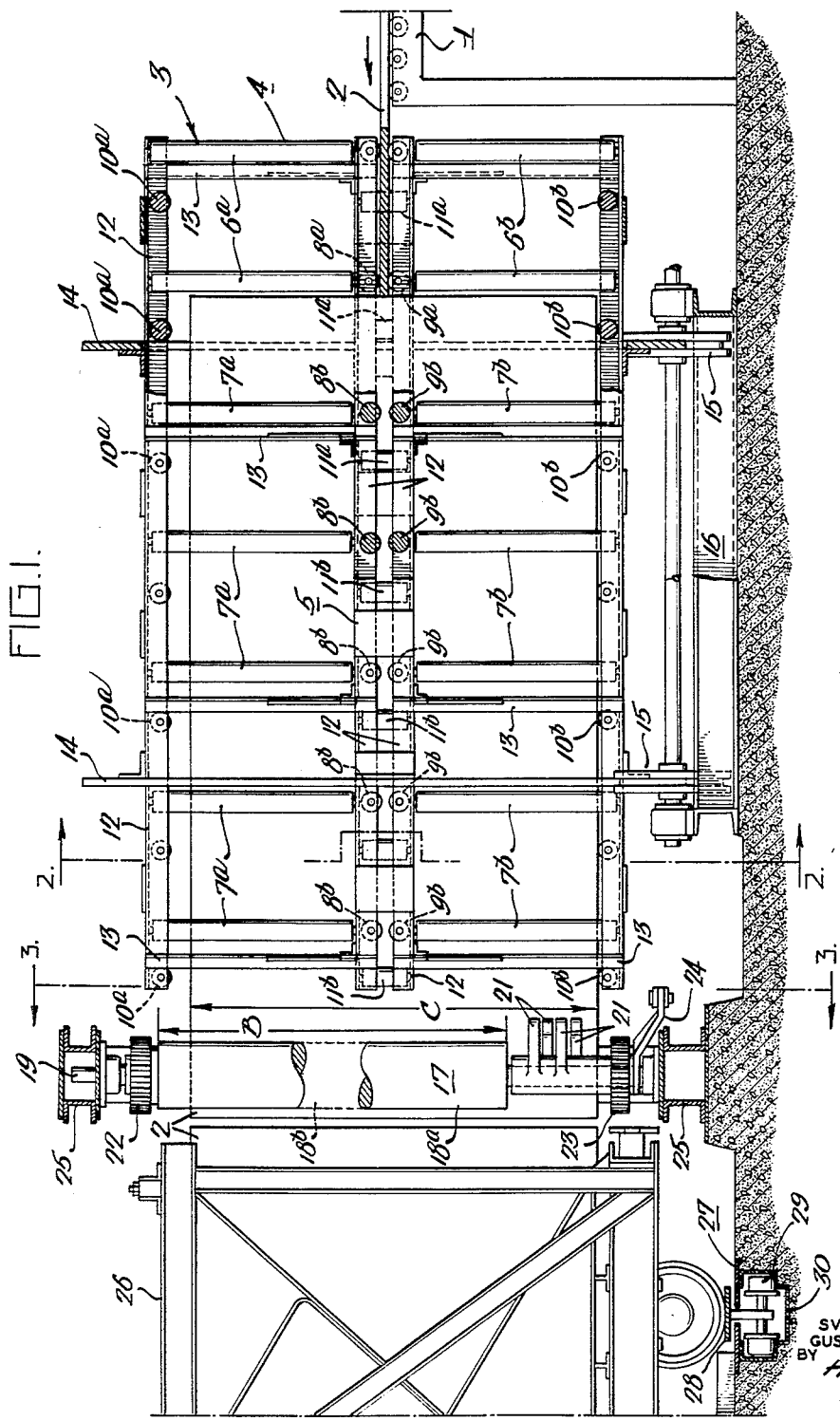

United States Patent Office 2,940,614
Patented June 14, 1960

2,940,614

LOADING AND UNLOADING APPARATUS FOR FIBERBOARD OR SHEETS OF SIMILAR MATERIAL

Sven Carlsson, Trollbacken, and Gustaf Hellner, Alingsas, Sweden, assignors to Aktiebolaget Svenska Flaktfabriken, Stockholm, Sweden Filed Sept. 12, 1958, Ser. No. 760,793

Claims priority, application Sweden Sept. 14, 1957

4 Claims. (Cl. 214—1)

The present invention relates to a loading and unloading apparatus for fiberboard or sheets of similar material to be transported vertically through a treatment chamber into which and out of which respectively said sheets are transported one by one in horizontal position.

The apparatus consists of turning equipment and a feeding mechanism co-operating with same. In earlier handling of sheets in the above described manner for instance in moistening or hardening of the sheets the required manual loading and unloading of the sheets during supply and discharge has represented a time-expensive step in the treatment procedure which in other respects nowadays is highly automatic.

The invention, the object of which is to eliminate this disadvantage and to make it possible to carry out the treatment steps fully automatically without any intervening manual operations, is mainly characterized in that the turning equipment consists of two transporting means for the supply and discharge respectively of said sheets. Each transporting means consists of twin conveyors, each divided along its centre line. The twin conveyors are disposed in different planes forming 90° with each other and intersecting along said centre line and are supported by a rotatable frame work for a stepwise turning of the conveyors around their common axis in order to put the conveyor alternatively in positions for the supply and the discharge of the sheets into and out from the turning equipment respectively.

The transporting means of the turning equipment suitably consists of rolling tables which along their sides are equipped with common edge rolls. According to a suitable embodiment of the loading and unloading apparatus the rotatable frame work of the turning equipment is made as two or more circular rings enclosing the transporting means, said rings resting on supporting and driving wheels or rollers. The feeding mechanism of the apparatus suitably consists of two feeding rolls arranged at one end of the turning equipment and disposed on both sides of a vertical plane through the axis of rotation for the turning equipment. The rolls have a height somewhat less than the width of the sheets and are mounted on vertical shafts on the free parts of which are arranged separately turnable hubs with projecting fingers which are relatively offset with respect to the height. The fingers by the turning of the hubs—after the rear edge of sheet has passed the nipping surface of the feeding rolls—mesh and push the sheet further forwards in order to bring the rear edge of said sheet free of the feeding rolls for the following transport step.

The invention shall now be described more in detail with reference to the accompanying drawings illustrating and exemplifying embodiment of the invention and in which Fig. 1 shows a side view with portions broken away illustrating a loading and unloading apparatus according to the invention;

Figs. 2 and 3 show cross sections taken on the lines 2—2 and 3—3 respectively of Fig. 1; and Fig. 4 is a section taken on the line 4—4 of Fig. 3.

In the drawing 1 designates a feeding table with horizontally arranged rolls disposed in front of the loading and unloading apparatus, the sheets designated 2 being fed one at a time into a turning equipment 3. The turning equipment consists of two transporting means 4 and 5 respectively, each consisting of twin conveyors, each divided along its centre line and being designated 6a—6b, 7a—7b and 8a—8b, 9a—9b respectively. The transporting means are, as can be seen, arranged in planes crossing each other along a centre line in 90° angle. In the illustrated embodiment the conveyors consist of rolling tables, which along their sides are equipped with edge rolls 10a, 10b and 11a, 11b respectively. The rolling tables and edge rolls are supported in lengthwise extending angle iron 12 which are connected by means of laterally extending angle irons 13. In the case shown the necessary frame work consists besides of said angle irons of circular rings 14 resting on supporting and driving wheels or rollers 15 which in their turn are supported by a mounting bed 16 of U-irons. 17 designates a feeding mechanism of the apparatus which consists of two driven feeding rolls designated 18a and 18b, mounted on vertical shafts 19 at one end of the turning equipment and disposed on both sides of a vertical plane A—A through the axis V of rotation. Said feeding rolls have a height B somewhat less than the width C of the sheets. On the free parts of the shafts 19 are arranged separately turnable hubs 20 with projecting fingers 21 which are relatively offset with respect to the height. A lever 24 is attached to one of said hubs and is arranged to be connected to a non-shown driving device in form of a forwards and backwards moving plunger or the like. The movement of the lever 24 is transmitted to the other hub by means of co-operating gears or cog-wheels 23. In corresponding manner the feeding rolls 18a and 18b respectively are equipped with gears or cog-wheels 22 for the co-ordination of the rotation of same. The two rolls are driven by means of a driving device not shown in the drawing. A base 25 is provided for the feeding mechanism. A truck 26 for the transport of the sheets within the treatment chamber is supported by a traverser 27 for a stepwise lateral movement of the truck, each step corresponding to the distance between the sheets being loaded side by side on the truck.

The function of the loading and unloading apparatus is as follows:

After a sheet 2 has been transported on the roller table 1 entirely into the turning equipment 3, said equipment is revolved 90°, whereby the second transporting means of the turning equipment is brought into a position suited for receiving a subsequent sheet from the roller table. While the second sheet is transported into the turning equipment, it pushes said first sheet—now being in vertical position—forwards so far that the leading edge of same is caught by the rolls 18a, 18b of the feeding mechanism. Said rolls then discharge said first sheet out of the turning equipment and into the truck 26 which in known manner is equipped with upper and lower guiding means for a plurality of vertically disposed sheets. The speed of the feeding rolls may suitably be somewhat greater than the speed of the subsequent sheet in the turning equipment. The last part of the transmission of the sheets to the truck 26—i.e. after the rear edge of the sheets has passed the nipping surface of the feeding rolls—is carried out by turning the hubs 20 journalled on the shafts of the feeding rolls. The fingers 21 of said hubs intermesh and catch the rear edge of the sheets from both sides. The sheets are hereby pushed further forwards in order to bring the rear edge of the sheets free of the feeding rolls 18a, 18b to enable the necessary lateral movement of the truck 26 to bring said truck in proper position to receive a following sheet. As earlier stated, said lateral movement is carried out by having the truck 26 supported by traverser 27. Said traverser may—as illustrated in the drawing—consist only of a pair of F-shaped beams 28 with its stem projecting below the floor surface and being provided with pairs of rolls 29, running on a pair of guiding rails 30.

What we claim is:

1. Apparatus for turning sheets between vertical and horizontal positions in their passage between a treatment chamber and transfer means, comprising a framework rotatable about a central longitudinal axis thereof, a first transporting means comprising longitudinal twin conveyors having two laterally-spaced coplanar sections respectively mounted on said framework at opposite sides of said central axis, a second transporting means coextensive with said first transporting means and comprising longitudinal twin conveyors having two laterally-spaced coplanar sections respectively mounted on said framework at opposite sides of said central axis, the planes of said first and second transporting means intersecting at an angle along said central axis, and feeding mechanism to feed successive sheets of material onto said first and second transporting means in alternation whereby each of said successive sheets is conveyed by one transporting means between the laterally-spaced sections of the other transporting means.

2. An apparatus according to claim 1, characterized in that the conveyors of the transporting means of the turning equipment consist of rolling tables and edge rolls along the sides of said tables disposed at right angles to the plane of said tables.

3. An apparatus according to claim 1, characterized in that the rotatable frame work is made as at least two circular rings enclosing the conveyors, and supporting and driving rollers mounting said rings.

4. An apparatus according to claim 1, characterized in that the feeding mechanism consists of two feeding rolls arranged at one end of the turning equipment a pair of shafts coextensive with the width of the sheets mounting said rolls and in nipping engagement on both sides of a vertical plane through said central axis, said rolls having a height less than the width of the sheets, and separately rotatable hubs mounted on the free parts of the shafts and having radially projecting fingers relatively offset with respect to the height, which fingers upon rotation of the hubs—after the rear edge of a sheet has passed the nipping surface of the feeding rolls—intermesh and push the sheet further forwards in order to bring the rear edge of said sheet free of the feeding rolls to permit rotation thereof about said central axis upon rotation of said framework.

References Cited in the file of this patent

UNITED STATES PATENTS

| | | |
|---|---|---|
| 682,973 | Condict | Sept. 17, 1901 |
| 1,476,050 | Buttress | Dec. 4, 1923 |
| 1,982,876 | McCrery | Dec. 4, 1934 |
| 2,421,874 | Fouse | June 10, 1947 |
| 2,623,627 | Maclennant | Dec. 30, 1952 |

FOREIGN PATENTS

| | | |
|---|---|---|
| 518,876 | Great Britain | Mar. 11, 1940 |